US 9,547,457 B1

(12) United States Patent
Banerjee

(10) Patent No.: US 9,547,457 B1
(45) Date of Patent: Jan. 17, 2017

(54) DETECTION OF FILE SYSTEM MOUNTS OF STORAGE DEVICES

(71) Applicant: Symantec Corporation, Mountain View, CA (US)

(72) Inventor: Amitrajit Banerjee, Maharashtra (IN)

(73) Assignee: Veritas Technologies LLC, Mountain View, CA (US)

( * ) Notice: Subject to any disclaimer, the term of this patent is extended or adjusted under 35 U.S.C. 154(b) by 360 days.

(21) Appl. No.: 14/039,751

(22) Filed: Sep. 27, 2013

(51) Int. Cl.
  *G06F 12/00* (2006.01)
  *G06F 17/30* (2006.01)
  *G06F 3/06* (2006.01)

(52) U.S. Cl.
  CPC .......... *G06F 3/0653* (2013.01); *G06F 3/0604* (2013.01); *G06F 3/0671* (2013.01); *G06F 17/30091* (2013.01)

(58) Field of Classification Search
  CPC ............ G06F 11/1474; G06F 17/30144; G06F 17/30174; G06F 17/30067; G06F 11/2097; G06F 3/061; G06F 2221/2101; G06F 2212/1008; G06F 2212/7207; H04L 63/10; H04L 63/105; H04L 63/1416; H04L 63/145; H04L 63/20; H04L 67/06; H04L 67/22; Y10S 707/99943; Y10S 707/99945; Y10S 707/99956; Y10S 707/99939
  See application file for complete search history.

(56) References Cited

U.S. PATENT DOCUMENTS

| 6,446,160 | B1 * | 9/2002 | Le | G06F 3/061 369/30.32 |
| 7,890,469 | B1 * | 2/2011 | Maionchi | G06F 17/30067 707/654 |
| 2002/0059309 | A1 * | 5/2002 | Loy | G06F 9/542 |
| 2006/0075092 | A1 * | 4/2006 | Kidokoro | H04L 41/069 709/224 |
| 2007/0047280 | A1 * | 3/2007 | Haustein | G06F 3/0617 365/1 |
| 2008/0114936 | A1 * | 5/2008 | Desai | G11B 15/689 711/115 |
| 2009/0019098 | A1 * | 1/2009 | Gunda | G06F 11/004 |
| 2009/0144545 | A1 * | 6/2009 | Dhuvur | G06F 21/552 713/165 |
| 2009/0265780 | A1 * | 10/2009 | Korkus | G06F 21/6281 726/22 |
| 2010/0076934 | A1 * | 3/2010 | Pershin | G06F 11/1451 707/640 |

(Continued)

*Primary Examiner* — Augustine K Obisesan
(74) *Attorney, Agent, or Firm* — Campbell Stephenson LLP

(57) ABSTRACT

Various systems and methods for selecting resources (such as of a distributed storage system) for detection of file system mounts of storage devices. For example, one method involves obtaining first information by performing an access of file information. The file information indicates attributes of data blocks stored by a storage device. The storage device includes the storage information. The first access is performed at a first time. The method also involves obtaining second information by performing another access of the file information, at a second time. The method also involves calculating a difference between the first information and the second information. The method involves determining, based on the difference, whether the device was dismounted between the first time and the second time.

20 Claims, 10 Drawing Sheets

(56) References Cited

U.S. PATENT DOCUMENTS

| | | | |
|---|---|---|---|
| 2010/0242109 A1* | 9/2010 | Lee | G06F 17/30144 726/22 |
| 2012/0324268 A1* | 12/2012 | Yoshida | G06F 17/3007 713/324 |
| 2013/0019065 A1* | 1/2013 | Floman | G06F 12/0862 711/137 |
| 2013/0151830 A1* | 6/2013 | Post | G06F 11/1435 713/2 |
| 2014/0040242 A1* | 2/2014 | Zhou | G06F 17/30067 707/722 |

* cited by examiner

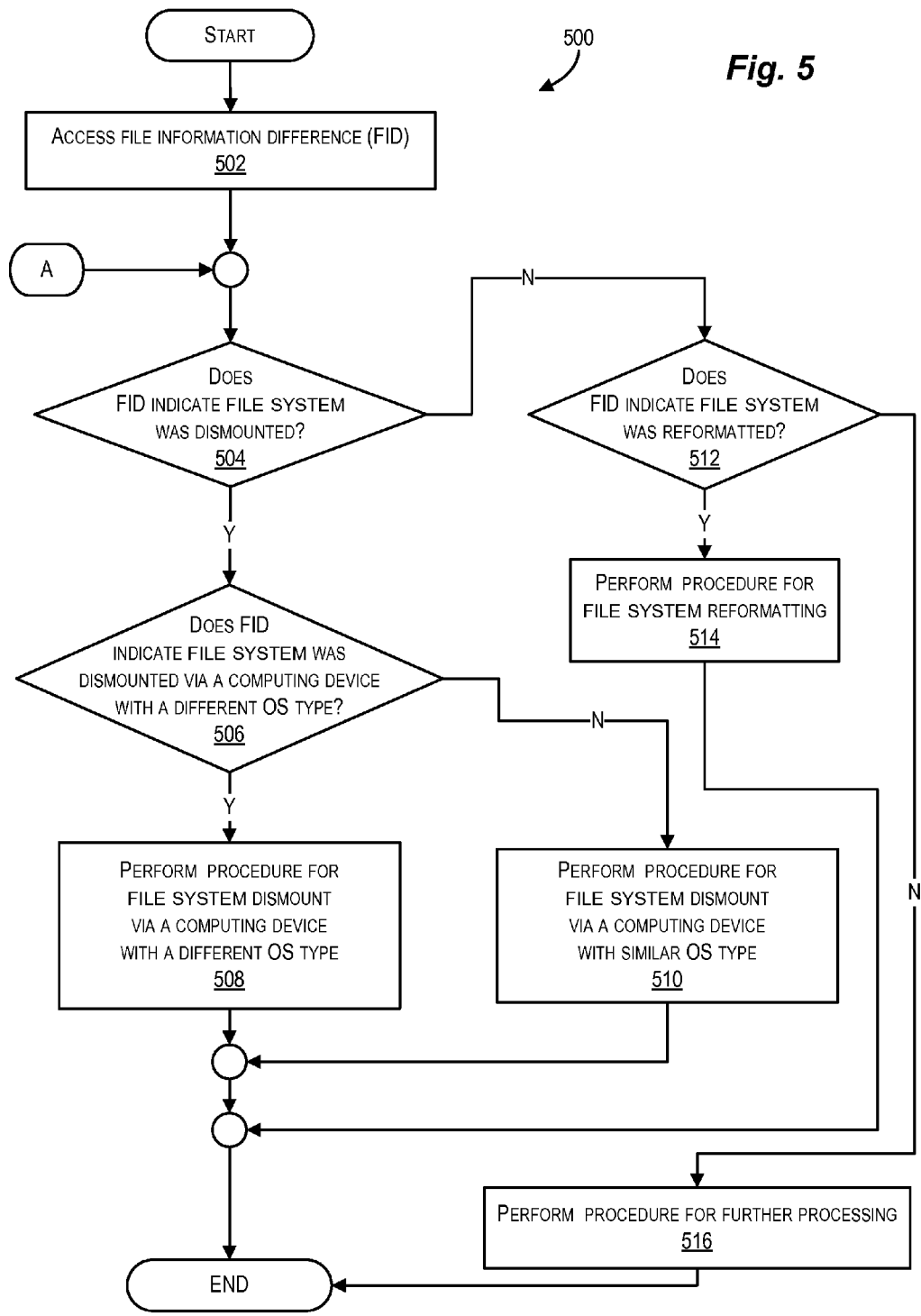

```
struct {
    NTFS_RECORD;
    __u64 chkdsk_lsn;           // The check disk log file sequence number for
                                // this restart page. Used when the
                                // changed to "CHKD". = 0
    __u32 system_page_size;     // Byte size of system pages >= 512
                                // and a power of 2. Use this to calculate the
                                // size of the usa and add this to the
                                // ntfs.usa_offset value. Then verify that the
                                // result is less than the value of the
                                // restart_offset. = 0x1000
    __u32 log_page_size;        // Byte size of log file records,
                                // >= 512 and a power of 2. = 0x1000
    __u16 restart_offset;       // Byte offset from the start of the record
                                // to the restart record. Value is aligned
                                // to 8-byte boundary. = 0x30
    __s16 minor_ver;            // Log file minor version. Check if major
                                // version is 1. (=1 but >=1 is treated the
                                // same and <=0 is also ok)
    __u16 major_ver;            // Log file major version (=1 but =0 is ok)
} RESTART_ZONE_PAGE_HEADER;
```

```
struct LFS_RESTART_ZONE
{
    // The highest LSN when this restart record was written
    _LSN CurrentLsn;                                          // 0x000
    // No. client records after restart area; 1
    USHORT LogClients;                                        // 0x008
    // Offset of free list or 0 for none
    USHORT ClientFreeList;                                    // 0x00A
    // Offset to uset records list or 0 or 0xFFFF
    USHORT ClientInUseList;                                   // 0x00C
    // Unknown; 0xFFFF or 0
    USHORT Flags;                                             // 0x00E
    #define LFS_UNKNOWN_FLAG_1 0x0001                         // NTFS 3.x unknown usage
    #define LFS_CLEAN_SHUTDOWN 0x0002                         // NTFS 3.x dismount: set if clean
    #define LFS_UNKNOWN_FLAG_8 0x0008                         // NTFS 3.x unknown usage
    // Used bits in sequence number
    // 0x0028 - 0x002E in NTFS 3.x, depending on FS size
    ULONG SequenceNumberBits;                                 // 0x010
    // Restart area size
    // 0x00C8 in NTFS 1.x
    // 0x00D0, 0x00E0 in NTFS 3.1
    USHORT RestartAreaSize;                                   // 0x014
    // Offset to client information; 0x30 or 0x40 = sizeof (LFS_RESTART_AREA)
    USHORT ClientArrayOffset;                                 // 0x016
    // Size in bytes of $LogFile
    ULONGLONG LogFileSize;                                    // 0x018
    // Last LSN data length
    ULONG LastLsnDataLength;                                  // 0x020
    // Size of this header
    // 0x0030 (48) for NTFS 1.2 and NTFS 3.0
    // 0x0068 for NTFS >= 3.1
    USHORT RecordHeaderLength;                                // 0x024
    // Offset to data in log page; 0x0030
    USHORT LogPageDataOffset;                                 // 0x026
    // Unknown;
    ULONG LogFileNumber;                                      // 0x028
    // Unknown;
    ULONG Unknown13;                                          // 0x02C
                                                              // sizeof = 0x030
} PACKED_STRUCT;
```

702

US 9,547,457 B1

DETECTION OF FILE SYSTEM MOUNTS OF STORAGE DEVICES

FIELD OF THE INVENTION

This application relates to storage systems. Particularly, this application relates to detection of mounts of storage devices of such storage systems.

BACKGROUND OF THE INVENTION

As businesses increasingly rely on computers for their daily operations, managing the vast amount of business information generated and processed has become a challenge. Most large businesses have a wide variety of application programs managing large volumes of data stored on many different types of storage devices across various types of networks and operating system platforms. These storage devices can include tapes, disks, optical disks, and other types of storage devices.

Performing various operations on the vast amount of data stored by such distributed storage systems has its complexities. Businesses can employ various tools to perform data backup, snapshots, and other file operations. However, some of these storage devices can be removable, allowing a storage device to be moved between different computing devices. Thus, accompanying this flexibility in distributed storage is the complexity of managing data stored by a large number of devices, including some devices that can be moved between various computing devices.

BRIEF DESCRIPTION OF THE DRAWINGS

The embodiments of the present application may be better understood, and its numerous objects, features, and advantages made apparent to those skilled in the art by referencing the accompanying drawings.

FIG. 5 is a flowchart of a method for performing various actions depending on a determination of whether a file system of a storage device was dismounted, according to one embodiment.

FIGS. 6 and 7 illustrate example file information used by a file system, according to some embodiments.

Figure 1:
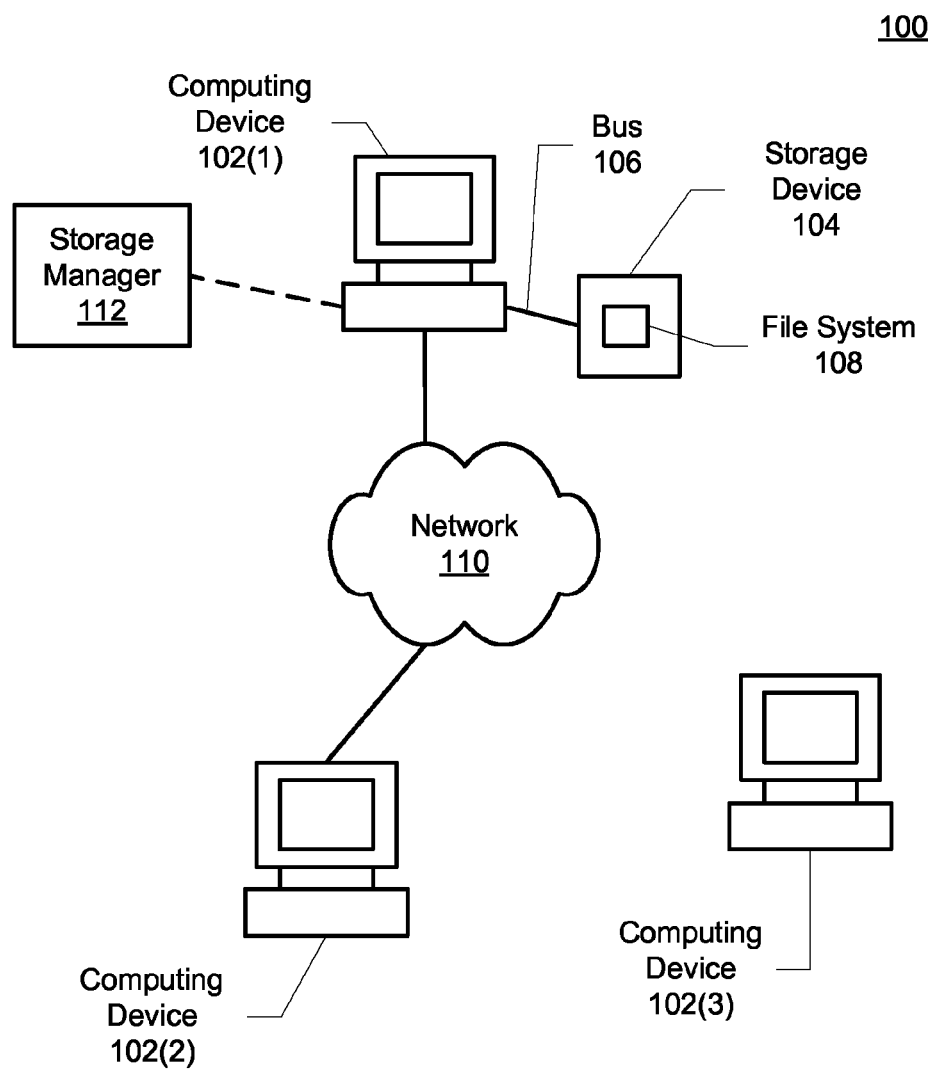
FIG. 1 is a block diagram illustrating a distributed storage system, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Embodiments of the present application are directed to systems and methods for obtaining first information by performing an access of file information. The file information indicates attributes of data blocks stored by a storage device. The storage device includes the storage information. The first access is performed at a first time. The method also involves obtaining second information by performing another access of the file information, at a second time. The method also involves calculating a difference between the first information and the second information. The method involves determining, based on the difference, whether the device was dismounted between the first time and the second time. Example systems for implementing these methods are shown in the following Figures, including FIG. 1.

FIG. 1 shows a system 100 that includes computing devices 102(1)-102(3) and a removable storage device 104 (also referred to as a storage device). Computing devices 102(1) and 102(2) are coupled together via a network 110. Each of computing devices 102 can be implemented using any type of a computer, such as a personal computer, a workstation, a server device, a mobile device (e.g., a smart phone, a tablet computer, a smart watch), and/or other type of a device having one or more processors and a memory. As shown, computing device 102(3) is not coupled to the other computing devices.

Storage device 104 stores data that is accessible and/or modifiable by computing devices 102. As shown, storage device 104 is coupled to computing device 102(1) using a bus 106. Storage device 104 can be coupled to computing device 102(1) using any one of a number of buses 106, such as USB, FIREWIRE, ETHERNET, FIBRE CHANNEL, BLUETOOTH, Integrated Drive Electronics (IDE), EIDE, ATA, Parallel ATA (PATA), Serial ATA (SATA), SCSI, Serial Attached SCSI, and the like. Storage device 104 can be implemented to store data using any one of a number of technologies, such as one or more hard disk drives (HDDs), tape drives, flash memory, solid state drives (SSDs), any one of optical drive technologies, EPROM/EEPROM, Magneto-resistive RAM (MRAM), and/or any type of NVRAMs, and the like.

Storage device 104 stores and organizes data using a file system 108. File system 108 can include metadata, file information, data, and/or other elements. File system 108 separates data into various elements (such as files and/or objects), identifies data using metadata (e.g., such that the stored data can be searched, indexed, and/or easily accessed). File system 108 can organize data using directories, such as by grouping files and/or objects using hierarchical data structures. File system 108 can also include file information that logs and/or otherwise indicates time and/or type of various operations (such as writes, modifications, deletions, new data items) performed on that data. It is noted that a single storage device can include multiple file systems.

File system 108 can be a disk file system, a flash file system, a tape file system, a database file system, a transactional file system, a network file system, or a shared file system. File system 108 can be implemented using New Technology File System (NTFS), File Allocation Table (FAT16, FAT32), VERITAS File System (VXFS), Hierarchical File System (HFS) and variants thereof (e.g., HFS Plus), UNIX File System (UFS), LINUX Extended File systems (EXT), Universal Disk Format (UDF), ISO 9600, Journaling Flash File System (JFFS), Yet Another Flash File System (YAFFS), IBM DB2, Global File System (GFS), Linear Tape File System (LTFS), various variants of these file systems, and the like. One implementation of file system 108 is described below with reference to FIG. 3.

Network 110 can include a WAN (Wide Area Network), such as the Internet, one or more LANs (Local Area Networks), and/or one or more SANs (Storage Area Networks). In some embodiments, network 110 includes one or more network devices, such as routers, switches, and the like, used to facilitate transmission of data between the various computing devices.

Storage device 104 contains data that is accessed and/or modified by a computing device, such as the computing device coupled to storage device 104. In the example of FIG. 1, computing device 102(1) can access (e.g., read and/or write) data stored on storage device 104. In one implementation, computing device 102(2) can also access (e.g., read and/or write) data stored on storage device 104, such as by accessing storage device 104 through computing device 102(1) via network 110.

A file system of a storage device is mounted to a computing device when the file system (such as directories, files, and/or data) of the storage device is readable by the operating system of the computing device. The storage device is typically connected to the computing device (such as using a bus) to facilitate mounting of the file system. Some storage devices can include multiple file systems; and when this storage device is connected to a computing device, only one of these multiple file systems can be mounted. Similarly, a file system of a storage device is dismounted from a computing device when the file system of the storage device is not readable by the operating system of the computing device. During dismounting of the file system, the storage device is typically disconnected (such from being connected via a bus).

Computing device 102(1) also includes a storage manager 112. Storage manager 112 is configured to detect if file system of storage device 108 was dismounted from computing device 102(1). It is noted that dismounting is also referred to as unmounting a unit of storage; for example, unmounting a directory from a mount point. Furthermore, in the following discussion, a file system being dismounted is sometimes referred to as a storage device (that includes this file system) is being dismounted.

Storage manager 112 is also configured to detect the type of such dismount if a dismount is detected. The dismount type can include a storage device being dismounted from computing device 102(1) to a computing device having a same type of an operating system, a storage device being dismounted from computing device 102(1) to a computing device having a different type of an operating system, a storage device being reformatted, and/or others. Storage manager 112 can, once the dismount and the dismount type are both detected, communicate with application(s) and/or the operating system of the computing device(s) with information indicating the type of dismount.

Computing device 102(1) can include one or more applications that access file system 108 on storage device 104. For example, computing device 102(1) can include a backup application and/or a change block tracker that perform file operations on files and/or data stored by storage device 104. These applications can include change block data that indicates changes to data stored by file system 108 of storage device 104. In one embodiment, storage manager 112 communicates with applications (and/or operating system) such as backup application and/or a change block tracker. Depending on the type of detected dismount, the application can perform one or more processes to update the corresponding change block data for storage device 104. These operations are described in more detail below with reference to FIGS. 2-5.

Figure 2A:
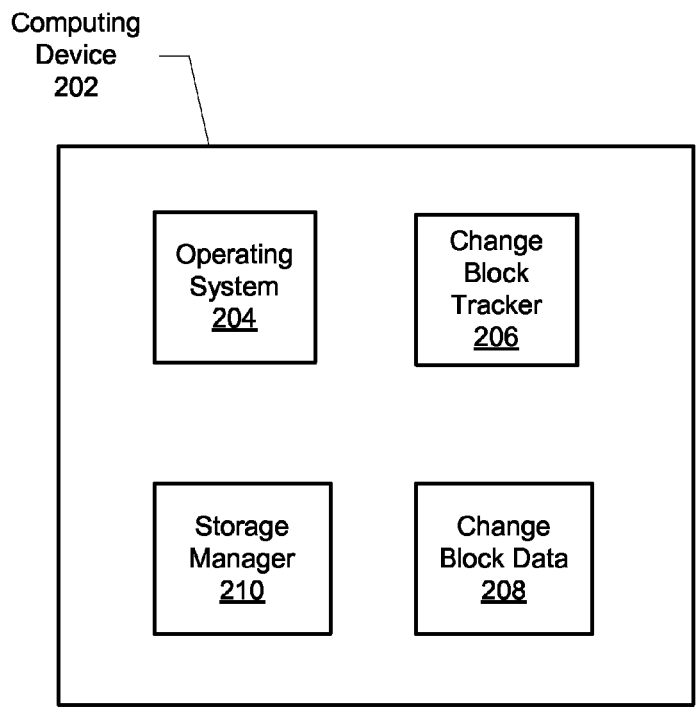
FIGS. 2A and 2B are block diagrams illustrating various components of a computing system and a storage manager, according to one embodiment.
Figure 2B:
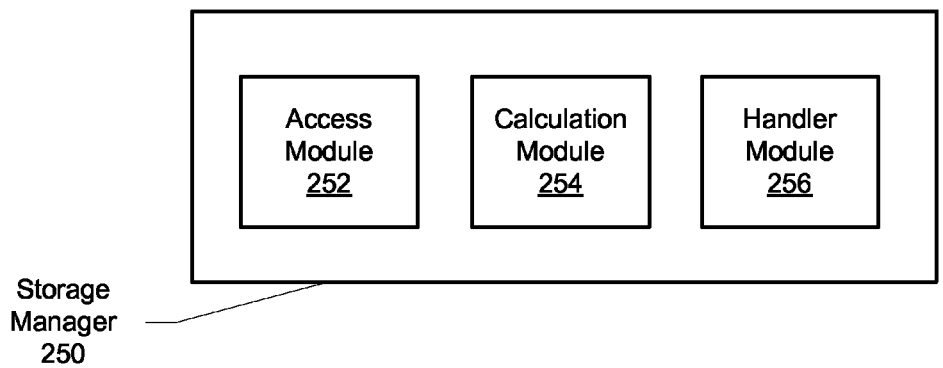

FIGS. 2A and 2B illustrate various elements of a computing device, such as computing device 102 of FIG. 1, according to some embodiments. It is noted that one or more of the elements of FIGS. 2A and/or 2B can be omitted or combined, as desired. Additional element(s) can also be used in addition to and/or instead of the elements being shown.

FIG. 2A illustrates a computing device 202 that includes an operating system 204, a change block tracker 206, change block data 208, and a storage manager 210. Operating system 204 performs typical operating system functionality for computing device 202, such as managing hardware resources for computing device 202 and providing services for any software applications to execute on computing device 202. Operating system (OS) 204 can be implanted as any type of a UNIX OS, any type of a MICROSOFT WINDOWS OS, any type of an APPLE MACINTOSH OS, any type of a GOOGLE CHROME OS, any type of an APPLE IOS, any type of a GOOGLE ANDROID OS, and the like.

Change block tracker 206 is a software application that keeps track of data (such as data files and/or data blocks) that are changed on a storage device that is coupled to computing device 202. Change block tracker 206 can be implemented as a stand-alone application or as part of another application (such as a back-up application). Change block tracker (CBT) 206 uses change block data 208 to store change information for each such file system of a storage device. The change information can include changes to metadata and/or changes to data of the file system. Changes to metadata can include changes to the directory structure of the file system, changes to the file location, type, access attributes, owner, and the like. Changes to the data include modifications to the actual data being stored, including data creation, modification, and/or deletion.

Storage devices can be moved between computing devices to port and share data. Each such movement of a storage device dismounts that storage device from one computing device and mounts the storage device on another computing device. Such moving around, though good for the users, may be an issue for CBT software, such as if the CBT software does not accurately account for data changes that occurred to the data stored by the storage device while the storage device was coupled to another computing device. In other words, such CBT software may not be able to report changed data blocks correctly if the CBT is not able to track such data changes that occur while the storage device is used by different computing devices.

Thus, if the file system of a storage device being currently monitored (by the CBT) is moved around different computing devices, then the integrity of the change block data kept by that CBT may be compromised. These other computing devices might not have the CBT software installed. These computing devices may be configured in a different fashion, such as by using an operating system of a different type and/or by using a different type of a file system. As a result of this different OS/file system configuration, the other computing devices would not be configured to properly monitor the newly attached storage device. For example, if this storage device receives any input/output (e.g., writes that modify the stored data), then these writes would not be tracked (i.e., any data changes would not be accounted for by the CBT or its change block data).

Upon reattaching the same storage device to the original computing device, the CBT module can resume its change tracking. However, without receiving any information about the storage device's mounting activity, the CBT module may be oblivious regarding any data changes made at the other computing device. As a result, the CBT module can report a smaller number of changed blocks than it should. This issue can compromise the integrity of the CBT, and can lead to poor and unreliable results to the consumer of such change blocks, e.g., to any backup software, which would not be able to perform a proper incremental backup (or a proper subsequent restore).

One implementation that ensures integrity of the CBT module may involve including change block data for each storage device by each such storage device. However, the multiple computing devices may either not include a proper CBT module, and/or may not be configured to access and modify such change block data. Another implementation involves using a storage manager, such as storage manager 210, to determine whether the storage device was dismounted, and if so, what type of dismounting was performed.

Storage manager 210 is configured to detect whether a storage device was dismounted. Storage manager 210 is also configured to determine a type of dismount of the storage device (that has been remounted). In other words, storage manager 210 can detect if/when an integrity of CBT 206 has been compromised, and thus the integrity of change block data 208. Storage manager 210 is also configured to communicate with application(s) and/or the operating system of the computing device(s) with information indicating the type of dismount. Storage manager 210 can take preventive measures, such as triggering a reset of CBT module 206, where a reset would restart the change block tracking process.

Storage manager 210 is configured to determine whether and how the storage device was dismounted based on accessing certain file information that is stored by the file system of such storage device. The file information can be implemented as a file, or as a form of metadata, that indicates various information for that storage device. In one implementation, such file information is generated and/or updated by the operating system of the computing device to which the file system is mounted. As such, storage manager 210 does not write data to this file information, only accesses the file information. Some implementations of such file information are described below with reference to FIGS. 3, 6, and 7.

FIG. 2B illustrates a storage manager 250 (that can implement storage manager 210 and/or 112) that includes an access module 252, a calculation module 254, and a handler module 256. Access module 252 is configured to access file information of a file system of a storage device. Calculation module 254 is configured to calculate, based on the accessed file information, whether the file system was dismounted from the computing device (i.e., from the computing device accessing the storage module at the time of this calculation being made). Calculation module 254 is further configured to calculate the type of such dismounting. Handler module 256 is configured to perform one or more handling processes, depending on the determination of calculation module 256. For example, handler module is configured to reset and/or reinitialize CBT 206 and/or change block data 208 if calculation module 254 determines that the file system of the storage device was reformatted.

Figure 3:
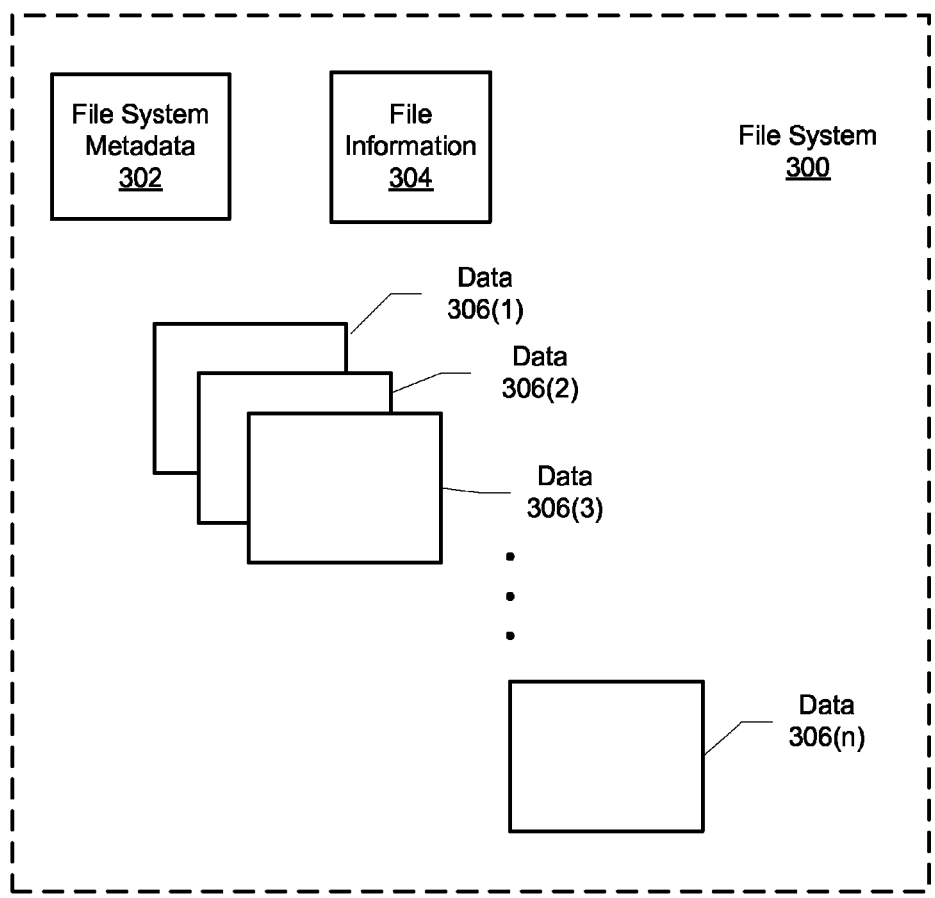
FIG. 3 is a block diagram illustrating an example file system of a storage device, according to some embodiments.

FIG. 3 illustrates various elements of a file system 300, such as file system 108 of FIG. 1, according to some embodiments. It is noted that one or more of the elements of FIG. 3 can be omitted or combined, as desired. Additional element(s) can also be used in addition to and/or instead of the elements being shown.

File system 300 (of a storage device) includes file system metadata 302, file information 304, and one or more data 306(1), 306(2), to 306(n). File system metadata 302 is generated and/or updated by the OS of the computing device to which file system 300 is mounted. File system metadata 302 can include various data structures that store information about data 306, such as location, name, hierarchical structure, access permissions, and/or type of files that contain data 306. One implementation of file system metadata 302 includes Modes or comparable data structures.

File information 304 is also generated and/or updated by the OS of the computing device to which file system 300 is mounted. File information 304 can include a list of transactions performed to data 306. File information 304 can be implemented as a log file, and thus contain an entry for very time a data write on files (that contain data 306) is performed. However, file information 304 does not necessarily indicate how the data is being changed, only a record of a write being performed.

File information 304 also includes indications of file system 300 being mounted. File information 304, including the mount indications, are modified when file system 300 is mounted to a new computing device. In other words, file information 300 is changed when the storage device that includes file system 300 is coupled to a new computing device. However, not all computing devices to which the storage device couples include operating systems that properly access file information 304.

In one case, file system 300 is remounted to the original computing device (such as if a user re-attaches the storage device to the same computing device). In this case, file information 304 can indicate such remounting activity. The original operating system of the computing device continues to update file system metadata 302 with any subsequent writes and/or modifications to data 306 (such as an addition of a file including data 306(2), or a deletion of a file containing data 306(1)). The storage manager of that computing device would also determine such a remount, and would continue with updating the CBT and change block data accordingly, without taking any additional steps.

In another case, file system 300 is mounted to a computing device with a foreign operating system (i.e., an OS that does not properly access file information 304, or one different from that having stored data within file system 300). The foreign OS is not configured to access and/or modify the file information (and especially mount indications) properly (i.e., in the manner that is understood by the original OS). In other words, the foreign file system is not configured to not properly (or at all) update file information 304 with indications of these data write(s) and/or deletion(s). In this case, upon the file system being mounted back onto the original computing device, or another computing device with an operating system that is configured to properly access file information 304, that computing device's OS (referred as a compatible OS) can take preventive steps as to avoid data loss.

The compatible OS can perform various functions to make sure that the data integrity of data 306 is proper (according to that compatible OS and/or the type of file system being used). However, due to file system 300 being mounted to a foreign OS, as well to the compatible OS performing data integrity functions on data 306, file system metadata 302, and/or file information 304, file system information 304 may not include a log of data changes and/or mount indications indicating file system 300 being mounted to the foreign OS. The storage manager is configured to determine this situation based on the contents of file information 304.

In some cases, file system 300 can be rolled back to some previous data access operation. For example, the computing device to which the storage device (containing file system 300) is coupled can have a power failure (or another system failure) during which some of the data writes to data 306 may not properly complete. Some of the logged data writes and/or modifications can be recorded by file information 304, but they may not be completed on data 306. Similarly, some of the data writes and/or modifications can be completed, but not properly recorded by file information 304. Thus, the operating system can roll-back some data writes and/or modifications to data 306. The storage manager is configured to determine this situation based on the contents of file information 304.

Still further, file system 300 can be reformatted by the operating system of the computing device. For example, the OS can reformat file system 300, which would delete and/or change substantially all of data 306 and/or corresponding file information 304 and/or file system metadata. The storage manager is configured to determine this situation based on the contents of file information 304.

In yet another case, file system 300 can be mounted to a compatible OS that is not the original computing device. A compatible OS is an OS that is configured to properly access and/or modify (i.e., access and/or modify in a manner comparable to the original OS) file system metadata 302 and file information 304, as well as configured to access data 306. The storage manager is configured to determine this situation based on the contents of file information 304, including whether file system 300 has been mounted back to the original OS after being mounted to another compatible OS, or whether file system 300 has been mounted to a compatible OS other than the original OS.

Figure 4:
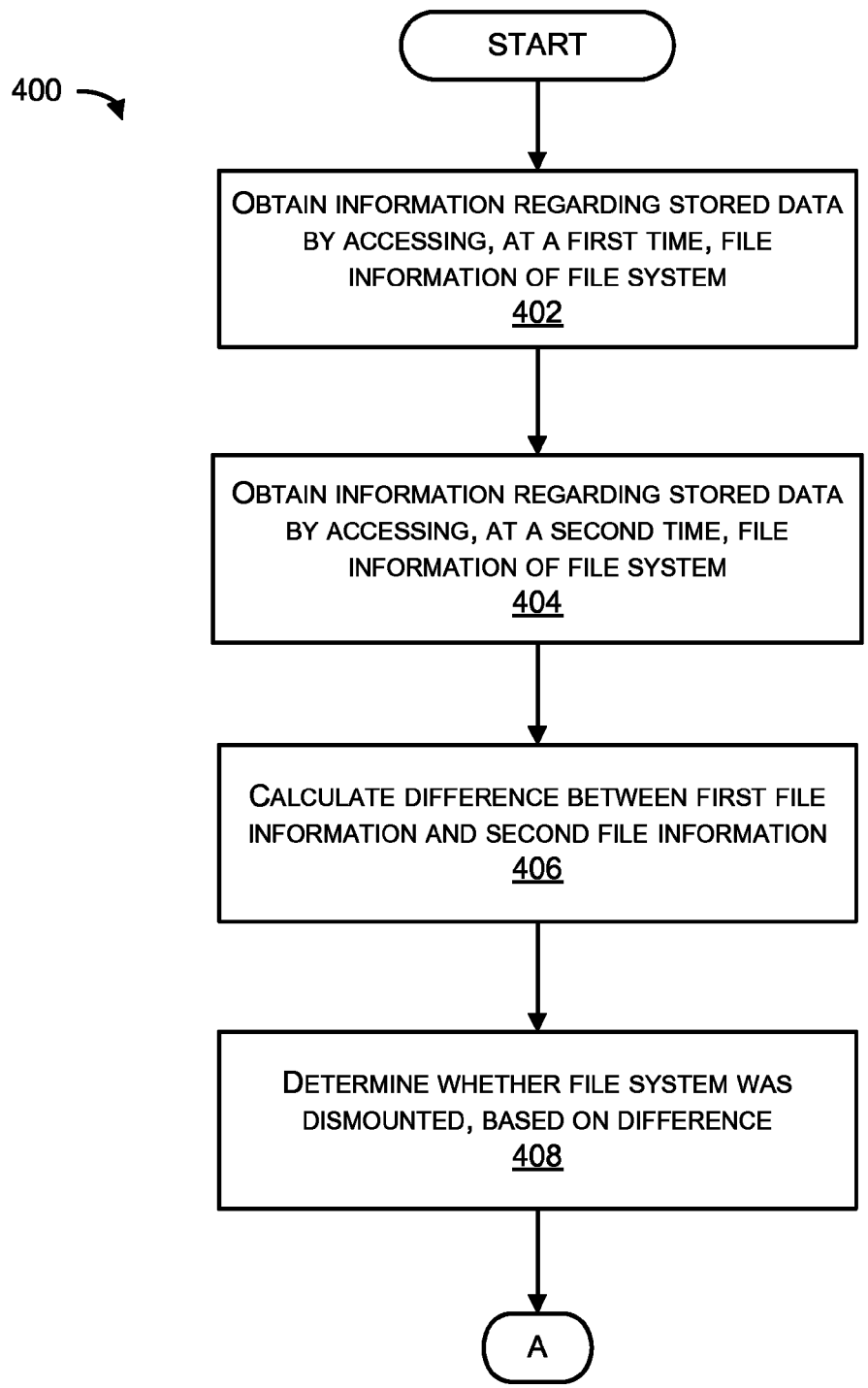
FIG. 4 is a flowchart illustrating a method for determining whether a file system of a storage device was dismounted, according to one embodiment.

FIG. 4 is a flowchart of a method 400 illustrating a determination of whether a file system of a storage device was dismounted, according to some embodiments. As will be appreciated in light of the present disclosure, this method may be modified in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 400 is described with reference to variations of the elements described in connection with FIGS. 1-3. In one implementation, at least a portion of method 400 can be implemented and/or performed by a storage manager, such as storage manager 112, storage manager 210 and/or storage manager 250.

In element 402, a storage manager obtains information regarding stored data. The storage manager can access, at a first time, file information of a storage device. The storage manager can also store at least a portion of the file information. For example, the storage manager 112 can access the file information of file system 108 of storage device 104. If the file information is implemented using a log file, the storage manager can access the data stored in this log file, including any mount indications (e.g., an indication that a given unit of data (e.g., a file directory, or the like) is mounted to a given mount point). As described below with reference to FIGS. 6 and 7, the mount indications can be implemented in several ways, including using a numeric value. This numeric value is accessed and updated by the operating system of the computing device.

As noted, typically only compatible operating systems are configured to modify the mount indications (regardless of the implementation of such mount indications), and operating systems that are not compatible with the type of file system used by the storage device are not configured to access and/or modify the file system, or at least the mount indicators.

In element 404, the storage manager obtains information regarding the stored data. The storage manager can access, at a second time, the file information of the storage device. The storage manager can access the file information at the second time in response to an event, such as the operating system of the computing device generated event (e.g., of a storage device being added, reconfigured, etc.). These operating system generated events can be general and do not indicate additional details regarding the event. The storage manager can also access the file information at a predetermined interval, such as every 5 seconds (or at any other time interval). In other words, the file manager does not receive information regarding dismounting, or type of dismounting, from obtaining the file information at this time.

In element 406, the storage manager calculates a difference between the file information accessed at these two different times. Depending on the implementation of the file information, the calculated difference can be one or more values, data, and/or a data object. For example, if the file information is implemented as a log file, and in elements 402 and 404 the storage manager accesses mount indications (e.g., that are implemented as numeric values), then the calculated difference is also a numeric value.

If the mount indications are implemented as Mode elements, then a difference can be calculated as a difference in Mode structure and/or value. If the mount indications are implemented as flags (for example a flag can be turned on for every mount of a given storage unit), then a difference can be calculated as a difference in which flags are present and/or enabled. If the mount indications are implemented as objects, then the difference can be calculated as a difference in the object value(s) and/or structure. Other implementations of mount indications are also contemplated (such as log files), and the disclosure is not limited to the examples given herein.

In element 408, the storage manager determines whether the file system was dismounted. The storage manager makes this determination based on the difference calculated in element 406. The storage manager can also determine the type of file system dismount, if any. The storage manager can store the difference information for later use, such for performing various actions based on the difference, one embodiment of which is described below with reference to FIG. 5.

FIG. 5 is a flowchart of a method 500 illustrating a performance of various actions based on the difference between file information, according to some embodiments. As will be appreciated in light of the present disclosure, this method may be modified in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 500 is described with reference to variations of the elements described in connection with FIGS. 1-3. In one implementation, at least a portion of method 500 can be implemented and/or performed by a storage manager, such as storage manager 112, storage manager 210 and/or storage manager 250. Method 500 can be performed using the difference calculated in method 400.

In element 502, a storage manager accesses a difference between file information. This difference, also referred to as file information difference (FID), is a difference between file information of a file system as accessed at two different points in time.

In element 504, the storage manager determines whether the file system was dismounted (between the first point in time and the second point in time) based on the accessed difference. In one implementation, if the difference includes a numeric value that is larger than some pre-determined number, then the file system was dismounted. The pre-determined number can be different depending on the type of the file system being used and/or on the type of the operating system being used.

If the storage manager determines that the file system was dismounted, element 506 is performed. If the storage manager determines that the file system was not dismounted, element 512 is performed. For example, if the difference is larger than a numeric value of 1 but smaller than a numeric value of 100, then the storage manager determines that the file system was dismounted. Continuing with this example, if the difference is larger than 100 or smaller than 1, then the then the storage manager determines that the file system was not dismounted. However, it is noted that these numeric value ranges are given for explanatory purposes only.

In element 506, the storage manager determines, based on the difference, whether the file system was dismounted via a computing device having a different OS type, also referred as a foreign OS. With reference to FIG. 1, the storage manager determines whether file system 108 of storage device 104 was dismounted from computing device 102(1) (that has a compatible OS) and mounted to computing device 102(2) (that has a foreign OS) prior to being mounted back onto a computing device with a compatible OS (such as computing device 102(1) having a compatible and original OS).

If the storage manager determines that the file system was dismounted via a computing device having a different OS type, element 508 is performed. If the storage manager determines that the file system was not dismounted via a computing device having a different OS type, 510 is performed. For example, if the difference is larger than a numeric value of 10 but smaller than a numeric value of 100, then the storage manager determines that the file system was dismounted via a computing device having a different OS type; otherwise the storage manager determines that the file system was not dismounted via a computing device having a similar OS type (also referred to a compatible OS). It is noted that these numeric value ranges are also given for the purposes of explanatory purposes only.

In element 508, the storage manager performs a procedure for a file system dismount via a computing device having a different OS type (such as a foreign OS). This procedure can include performing an integrity check of any change block data that is maintained by a CBT for this file system.

In element 510, the storage manager performs a procedure for a file system dismount via a computing device having a similar OS type (such as a compatible OS, or a compatible and original OS). This procedure can include proceeding with the CBT maintenance of the change block data, as the file system information likely includes log data for substantially all of the writes and/or modifications to the data stored by the file system.

In element 512, the storage manager determines, based on the difference, whether the file system was reformatted. If the storage manager determines that the file system was reformatted, element 514 is performed. If the storage manager determines that the file system was not reformatted, element 516 is performed. Continuing with the example above, if the difference is larger than a numeric value of 100, then the storage manager determines that the file system was reformatted. In one implementation, if the difference is zero or negative (i.e., the second value is smaller than the first value), then the file system was not reformatted. It is noted that these numeric value ranges are also given for the purposes of explanatory purposes only.

In element 514, the storage manager performs a procedure for a file system that has been reformatted. This procedure can include restarting the change block data maintained by a CBT for this file system, as any data stored by the file system is deleted.

In element 516, the storage manager performs a procedure for further processing of the file system. This can include, for example, performing operations in response to an operating system rolling back one or more write operations on data being stored by the file system.

FIGS. 6 and 7 illustrate examples of file information used by a file system, such as file information 304 of FIG. 3. It is noted that the file information of FIGS. 6 and 7 illustrate implementations of file information as used by NTFS file systems, and thus by MICROSOFT WINDOWS operating systems. Thus, in this example, the file system of FIG. 3 is implemented using the NTFS file system.

FIG. 6 illustrates a portion 600 of a log file that is used by NTFS that keeps track of an Update Sequence Number (USN) journal. The USN journal is typically a part of file system metadata, and it is used by the OS to record changes made to the corresponding NTFS file system.

The log file consists of a series of log records, and is updated for every transaction performed on the file system. In this implementation, the log file is a sequence of log records, with the type "RCRD", followed by a sequence of restore records of type "RSTR." The logging area consists of a sequence of log records. The log record contains a sequence of variable sized records. Upon a transaction of a write a file on a file system of a storage device, the OS typically updates the file, any tables of the file system (as can be implemented using file system metadata), and also record this transaction in the log file.

If the transaction is realized (i.e., performed), CBT software on that computing device can verify that the file is written to the storage device, and that the file system has been left in a defined state. The verification of the file system is performed by accessing the file information in the manner described with reference to FIG. 4. If the transaction is not realized (in case of e.g. power failure, or system failure in general), the file system is in an undefined state. In this case, the OS accesses a log file that logs transaction on the file system that have been successfully completed. At the first access to the disk after a system failure, the OS can read this log file and roll back all the operations to the beginning of the last transaction.

The log file can include several so-called restart areas. When the volume (i.e., the file system of the storage device) is dismounted, these restart areas are similar, even substantially identical. The restart areas are followed by log records organized in pages headed by a record header going up to log file size.

Log portion 600 illustrates a log file restart area record. In one implementation, the offset of this record is found by adding the offset of the RESTART_ZONE_PAGE_HEADER to the restart offset value found in it.

FIG. 7 illustrates a restart zone 700 of a log file (e.g., as indicates by the log file restart area record of FIG. 6). Restart zone 700 includes a logfilenumber value 702 which is initialized at the time of a format operation of the volume, with NTFS and then at each mount the value is incremented by NTFS. The storage manager is configured to read (and locally store) this value at the time of initial attachment of the volume (i.e., the file system of the storage device). The storage manager is also configured to access and check this value at each mount of the volume.

As also described with reference to FIGS. 4 and 5, the storage manager can calculate a difference in this value between each mount. In one example, this value is incremented by a compatible OS by one each time the volume is mounted. Therefore, if the storage manager determines that the value has been incremented more than once (i.e., the difference is more than 2), the storage manager can determine that the volume was mounted somewhere outside the domain of the CBT of the computing device. In other words, it is also possible for the volume to be remounted to the same computing device. These and other scenarios are described above with reference to FIGS. 3 and 5.

Figure 8:
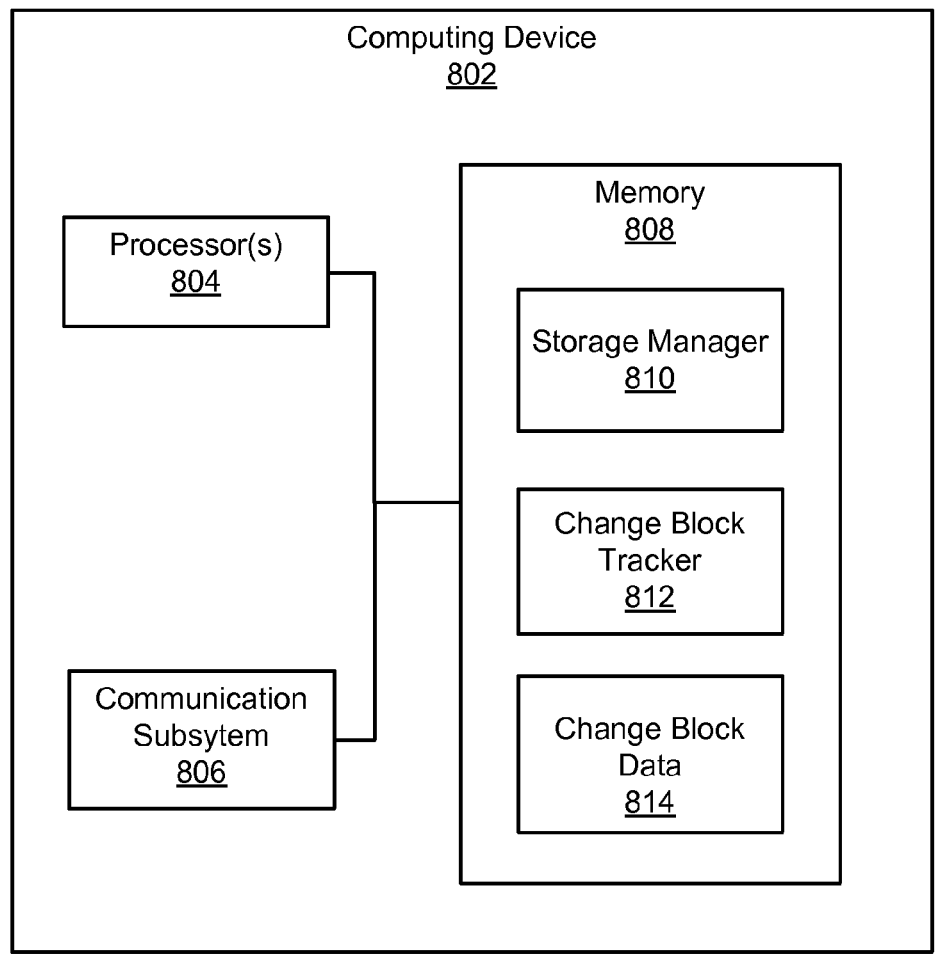
FIG. 8 is a block diagram illustrating an example computing device, according to one embodiment.

FIG. 8 is a block diagram of a computing device 802, such as computing device 102 and/or 202, according to one or more embodiments. Node 802 includes one or more processor(s) 804, a communication subsystem 806, and memory 808. Memory 808 can include one or more of operating system (not shown), storage manager 810, change block tracker (CBT) 812, and change block data 814. Processor(s) 804 can execute one or more of operating system, storage manager 810, and/or CBT 812. Communication subsystem 806 can facilitate communication with other computing devices and/or resources over a network.

Storage manager 810 can implement storage manager 112, storage manager 210, and/or storage manager 250, and can implement one or more of methods 400-500. CBT module 812 can implement CBT module 206. Change block data 814 can implement change block data 208. It is noted that in some embodiments, one or more of elements of computing device 802 may not be used. In some embodiments, one or more of elements of computing device 802 may be combined, as desired.

Elements of network architecture can be implemented using different computer systems and networks. An example of one such network environment is described below with reference to FIG. 9.

Figure 9:
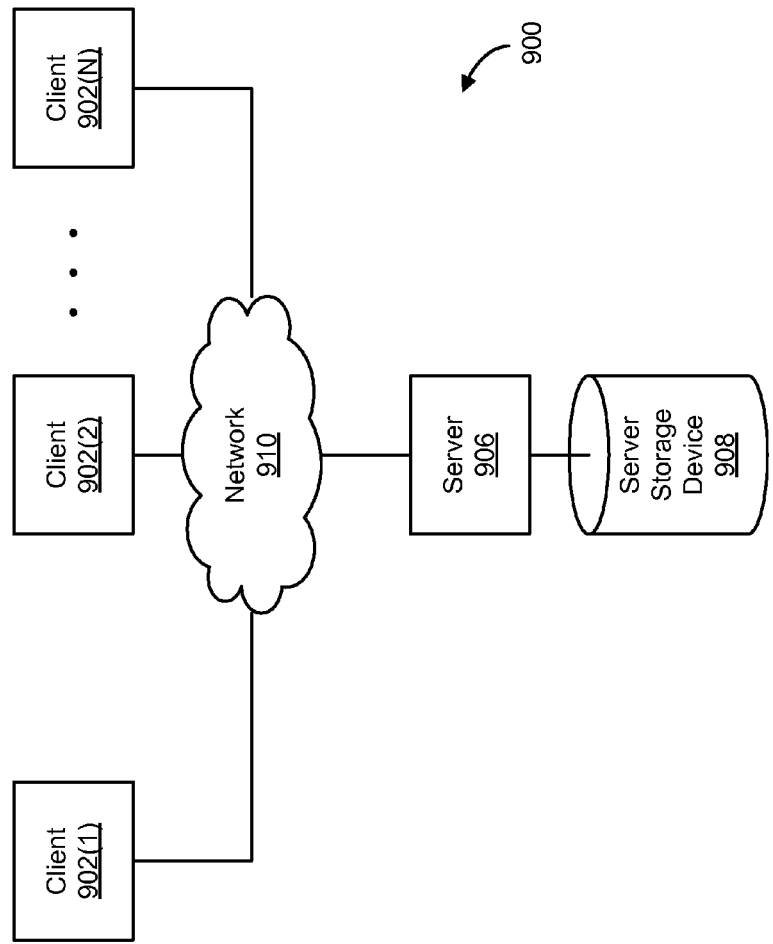
FIG. 9 is a block diagram illustrating a network architecture in which embodiments of the present application can be implemented.

FIG. 9 is a simplified block diagram illustrating a network architecture 900 in which one or more clients are provided with access to a server via various network connections. As depicted in FIG. 9, clients 902(1)-(N) are coupled to a network 910, and so are able to access a server 906 (which can be used to implement computing devices of FIGS. 1 and 2A/2B and/or hardware resources of FIGS. 2A and 2B) via network 910. Other servers (not shown) can be used instead to implement these computing devices and/or hardware resources of FIGS. 1-2A/2B. A client can be implemented using, for example, a desktop computer, a laptop computer, a workstation, a server, a cell phone, a smart phone, a network-enabled personal digital assistant (PDA), or the like. An example of network 910, which can be used by clients 902(1)-(N) to access server 906, is the Internet. Alternatively, access to server 906 can be provided by a local area network (LAN) utilizing Ethernet, IEEE 802.11x, or some other communications protocol. As will be appreciated, server 906 can be accessed by clients coupled directly thereto (not shown).

As also depicted on FIG. 9, server 906 is coupled to a server storage device 908, which includes a data volume such as storage device 104, among others. Server storage device 908 can be implemented as a single storage device or a collection of storage devices. Server storage device 908 can also be implemented as a storage area network, which couples remote storage devices to a server (e.g., server 906), such that the remote storage devices appear as locally-attached storage devices to the server's OS, for example.

In light of the present disclosure, those of skill in the art will appreciate that server storage device 908 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 900 can include other components such as routers, firewalls and the like that are not germane to the discussion of the present network and will not be discussed further herein. Those of skill in the art will also appreciate that other configurations are possible. For example, clients 902(1)-(N) can be directly coupled to server storage device 908 without the user of a server or Internet; server 906 can be used to implement both the clients and the server; network architecture 900 can be implemented without the use of clients 902(1)-(N); and so on.

As an example implementation of network architecture 900, server 906, services requests to data generated by clients 802(1)-(N) to data stored in server storage device 908. Any of the functionality of the computing devices can be implemented using one of the other servers in the manner illustrated by FIGS. 1-2.

Figure 10:
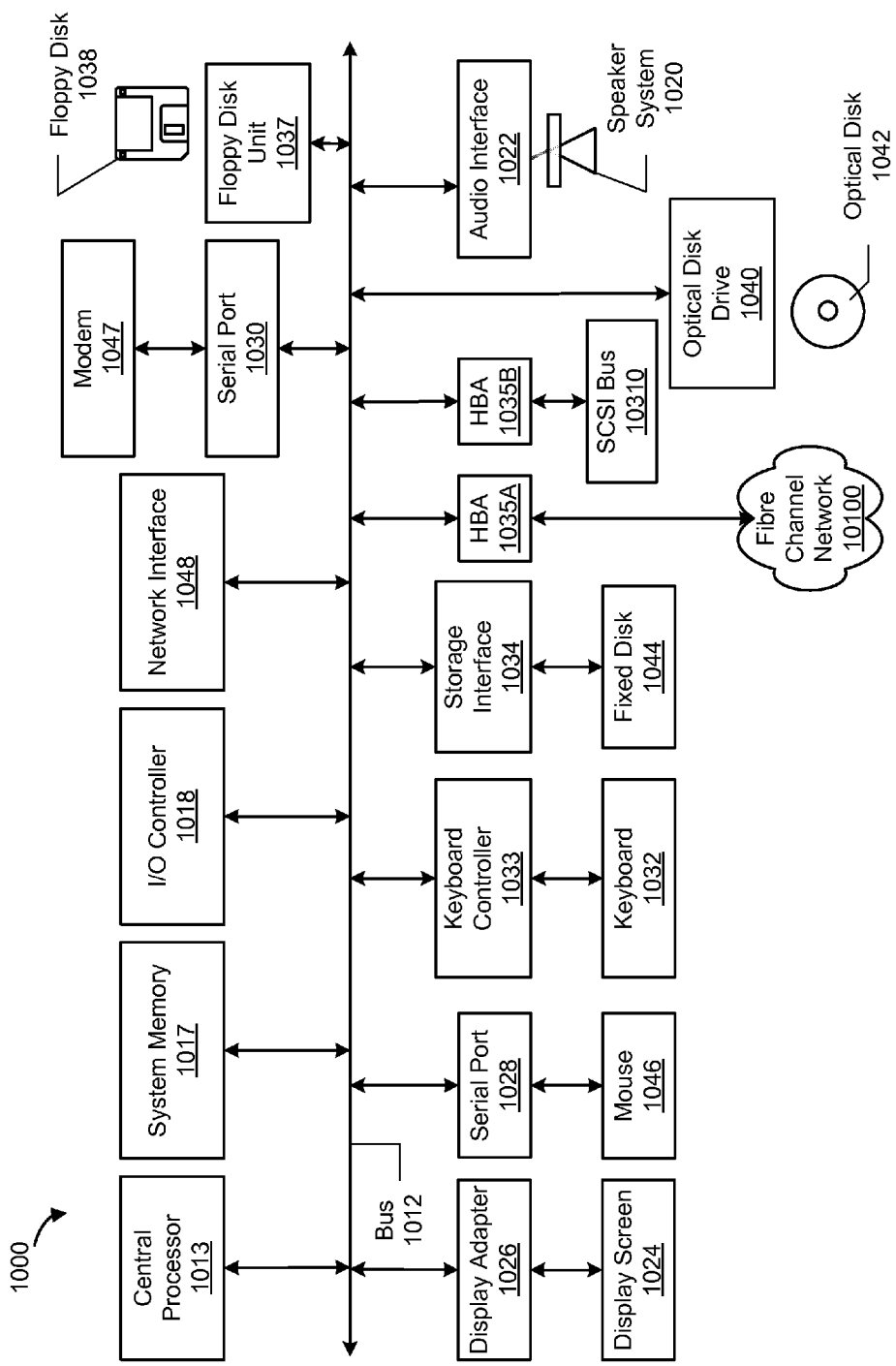
FIG. 10 is a block diagram that illustrates an example of a computer system suitable for implementing embodiments of the present application.

FIG. 10 depicts a block diagram of a computer system 1010 suitable for implementing the present disclosure. Computer system 1010 may be illustrative of various computer systems in the networked system of FIG. 1, such as node(s) and/or storage node(s), among others. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 946 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1010 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. The operation of a computer system such as that shown in FIG. 10 is readily known in the art and is not discussed in detail in this application. Code for detection of mounts of storage devices (such as described above with reference to the methods of FIGS. 4-5), etc., to implement the present disclosure can be stored in computer-readable storage media such as one or more of system memory 1017, fixed disk 1044, optical disk 1042, or floppy disk 1038. Memory 1020 is also used for storing temporary variables or other intermediate information during the execution of instructions by the processor 1010. The operating system provided on computer system 1010 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   obtaining first information by performing a first access of file information, wherein
   the file information indicates one or more attributes of one or more data blocks stored by a storage device, wherein
   the one or more attributes comprise information indicating a first type of operating system implemented by a first computing device,
   the storage device comprises the file information, and
   the first access is performed at a first time;
   obtaining second information by performing a second access of the file information,
   wherein
   the one or more attributes further comprise information indicating a second type of operating system implemented by a second computing device, and
   the second access is performed at a second time;
   determining, using one or more processors, whether the storage device was dismounted from the first computing device between the first time and the second time, wherein
   the determining uses the first information and the second information; and
   in response to a determination that the storage device was dismounted between the first time and the second time, determining whether the storage device was mounted to the second computing device while the storage device was dismounted, wherein
   the determining whether the storage device was mounted to the second computing device uses the first information and the second information, and
   the determining whether the storage device was mounted to the second computing device is based, at least in part, on determining whether the first type of operating system and the second type of operating system are different from one another.

2. The method of claim 1, wherein
   the file information comprises a log file,
   the log file is modifiable by an operating system,
   the log file indicates a plurality of transactions performed on the one or more data blocks, and
   the first access and the second access both access the log file.

3. The method of claim 1, wherein
   the file information further indicates one or more changes to the one or more data blocks, and
   the file information is updated in accordance with a first file system.

4. The method of claim 1, further comprising:
   determining an occurrence of one of a plurality of events, wherein
   each of the plurality of events indicates a change to a file system, and the second access is performed in response to a determination of the occurrence of the one of the plurality of events.

5. The method of claim 1, wherein
the obtaining the first information and the obtaining the second information are performed while the storage device is coupled to the first computing device,
the file information is created in accordance with a first file system, and
an operating system of the first type is configured to modify the file information.

6. The method of claim 1, wherein
change block data indicates one or more changes to the one or more data blocks, and
the change block data is separate from the file information,
and further comprising:
in response to a determination that the storage device was mounted to the second computing device,
continuing updating the change block data without a data integrity process on a change block tracker.

7. The method of claim 1, further comprising:
in response to a determination that the storage device was mounted to the second computing device,
performing a data integrity process on a change block tracker.

8. The method of claim 1, wherein
change block data indicates one or more changes to the one or more data blocks, and
the change block data is separate from the file information,
and further comprising:
determining whether the storage device was reformatted; and
in response to a determination that the storage device was reformatted, performing a restart operation on the change block data.

9. The method of claim 1, further comprising
updating change block data, wherein
the change block data indicates one or more changes to the one or more data blocks, and
the change block data is separate from the file information.

10. The method of claim 9, wherein
the determining whether the storage device was dismounted comprises determining integrity of the change block data.

11. The method of claim 1, wherein
the obtaining the first information and the obtaining the second information are performed while the storage device is coupled to the first computing device,
the file information is created in accordance with a first file system, and
the first type of operating system is configured to modify the file information.

12. A system comprising:
one or more processors;
a storage manager, wherein
the storage manager is configured to
obtain first information by performing a first access of file information, wherein
the file information indicates one or more attributes of one or more data blocks stored by a storage device, wherein
the one or more attributes comprise information indicating a first type of operating system implemented by a first computing device,
the storage device comprises the file information, and
the storage manager is configured to perform the first access at a first time,
obtain second information by performing a second access of the file information, wherein
the one or more attributes further comprise information indicating a second type of operating system implemented by a second computing device, and
the storage manager is configured to perform the second access at a second time,
determine whether the storage device was dismounted from the first computing device between the first time and the second time, wherein
the storage manager is configured to perform the determination by using the first information and the second information, and
in response to making a determination that the storage device was dismounted between the first time and the second time, determine whether the storage device was mounted to the second computing device while the storage device was dismounted, wherein
determining whether the storage device was mounted to the second computing device uses the second information, and
the determining whether the storage device was mounted to the second computing device is based, at least in part, on determining whether the first type of operating system and the second type of operating system are different from one another;
and wherein
the storage manager is configured to be executed using the one or more processors.

13. The system of claim 12, wherein
the file information comprises a log file,
the log file is modifiable by an operating system,
the log file indicates a plurality of transactions performed on the one or more data blocks, and
the first access and the second access both access the log file.

14. The system of claim 12, wherein
the storage manager is configured to obtain the first information and the second information while the storage device is coupled to the first computing device,
the file information is created in accordance with a first file system, and
an operating system of the first type is configured to modify the file information.

15. The system of claim 12, wherein
the file information further indicates one or more changes to the one or more data blocks, and
the file information is updated in accordance with a first file system.

16. The system of claim 12, wherein
change block data indicates one or more changes to the one or more data blocks, and
the change block data is separate from the file information, and
the storage manager is further configured to
determine whether the storage device was reformatted; and
in response to a determination that the storage device was reformatted, perform a restart operation on the change block data.

17. A computer program product comprising:
a plurality of instructions, comprising
a first set of instructions, executable on a computer system, configured to
obtain first information by performing a first access of file information, wherein
the file information indicates one or more attributes of one or more data blocks stored by a storage device, wherein
the one or more attributes comprise information indicating a first type of operating system implemented by a first computing device,
the storage device comprises the file information, and
the storage manager is configured to perform the first access at a first time,
a second set of instructions, executable on the computer system, configured to
obtain second information by performing a second access of the file information, wherein
the one or more attributes further comprise information indicating a second type of operating system implemented by a second computing device, and
the storage manager is configured to perform the second access at a second time,
a third set of instructions, executable on the computer system, configured to
determine whether the storage device was dismounted from the first computing device between the first time and the second time, wherein
the storage manager is configured to perform the determination by using the first information and the second information, and
a fourth set of instructions, executable on the computer system, configured to
determine, in response to making a determination that the storage device was dismounted between the first time and the second time, whether the storage device was mounted to the second computing device while the storage device was dismounted, wherein
determining whether the storage device was mounted to the second computing device uses the second information, and
the determining whether the storage device was mounted to the second computing device is based, at least in part, on determining whether the first type of operating system and the second type of operating system are different from one another; and
a non-transitory computer-readable storage medium, wherein the instructions are encoded in the non-transitory computer-readable storage medium.

18. The computer program product of claim 17, wherein
the file information comprises a log file,
the log file is modifiable by an operating system,
the log file indicates a plurality of transactions performed on the one or more data blocks, and
the first access and the second access both access the log file.

19. The computer program product of claim 17, wherein
the obtaining the first information and the obtaining the second information are performed while the storage device is coupled to the first computing device,
the file information is created in accordance with a first file system, and
an operating system of the first type is configured to modify the file information.

20. The computer program product of claim 17, wherein
change block data indicates one or more changes to the one or more data blocks, and
the change block data is separate from the file information, and
the plurality of instructions further comprise:
a fifth set of instructions, executable on a computer system, configured to
determine whether the storage device was reformatted; and
in response to a determination that the storage device was reformatted, perform a restart operation on the change block data.

* * * * *